United States Patent
Elhamias (10) Patent No.: US 10,031,850 B2
(45) Date of Patent: Jul. 24, 2018

(54) SYSTEM AND METHOD TO BUFFER DATA

(75) Inventor: Reuven Elhamias, Kfar Vradim (IL)

(73) Assignee: Sandisk Technologies LLC, Addison, TX (US)

( * ) Notice: Subject to any disclaimer, the term of this patent is extended or adjusted under 35 U.S.C. 154(b) by 8 days.

(21) Appl. No.: 13/154,751

(22) Filed: Jun. 7, 2011

(65) Prior Publication Data

US 2012/0317365 A1 Dec. 13, 2012

(51) Int. Cl.
*G06F 13/00* (2006.01)
*G06F 12/0862* (2016.01)
*G06F 12/0866* (2016.01)

(52) U.S. Cl.
CPC ...... *G06F 12/0862* (2013.01); *G06F 12/0866* (2013.01); *G06F 2212/214* (2013.01); *G06F 2212/221* (2013.01); *Y02D 10/13* (2018.01)

(58) Field of Classification Search
None
See application file for complete search history.

(56) References Cited

U.S. PATENT DOCUMENTS

| | | |
|---|---|---|
| 7,245,556 B1 | 7/2007 | Pinto et al. |
| 7,424,587 B2 | 9/2008 | Caulkins et al. |
| 7,536,540 B2 | 5/2009 | Holtzman et al. |
| 8,015,360 B2 * | 9/2011 | Hong et al. ............... 711/137 |
| 8,024,545 B2 * | 9/2011 | Kim et al. ............... 711/206 |
| 2004/0088490 A1 * | 5/2004 | Ghosh ............... G06F 12/0862 711/137 |

(Continued)

FOREIGN PATENT DOCUMENTS

EP 1582986 A2 10/2005

OTHER PUBLICATIONS

The International Search Report and Written Opinion of the International Searching Authority dated Aug. 7, 2012 in International Application No. PCT/US2012/037068, 11 pages.

(Continued)

*Primary Examiner* — Charles Rones
*Assistant Examiner* — Han Doan
(74) *Attorney, Agent, or Firm* — Michael Best & Friedrich LLP (57) ABSTRACT

A data storage device includes a controller, a non-volatile memory, and a buffer accessible to the controller. The buffer is configured to store data retrieved from the non-volatile memory to be accessible to a host device in response to receiving from the host device one or more requests for read access to the non-volatile memory while the data storage device is operatively coupled to the host device. The controller is configured to read an indicator of cached data in response to receiving a request for read access to the non-volatile memory. The request includes a data identifier. In response to the indicator of cached data not indicating that data corresponding to the data identifier is in the buffer, the controller is configured to retrieve data corresponding to the data identifier as well as additional data from the non-volatile memory and to write the data corresponding to the data identifier and the additional data to the buffer. The controller is configured to update the indicator of cached data in response to retrieved data from the non-volatile memory being written to the buffer.

24 Claims, 5 Drawing Sheets

(56) References Cited

U.S. PATENT DOCUMENTS

| | | | |
|---|---|---|---|
| 2004/0093538 A1* | 5/2004 | Hester | G06F 11/3636 714/45 |
| 2005/0195635 A1* | 9/2005 | Conley | G06F 12/0866 365/149 |
| 2005/0251630 A1* | 11/2005 | Matthews | G06F 12/0866 711/138 |
| 2006/0059194 A1* | 3/2006 | Oh | G06F 21/445 |
| 2006/0064539 A1* | 3/2006 | Mukaida | G06F 12/0246 711/103 |
| 2006/0077832 A1* | 4/2006 | Cho | 369/47.36 |
| 2007/0156998 A1* | 7/2007 | Gorobets | 711/170 |
| 2007/0214325 A1* | 9/2007 | Sasamoto | G06F 12/0862 711/137 |
| 2007/0271494 A1* | 11/2007 | Gorobets | G06F 11/1068 714/763 |
| 2008/0086603 A1* | 4/2008 | Lahtinen | G06F 12/0284 711/147 |
| 2008/0209114 A1* | 8/2008 | Chow et al. | 711/103 |
| 2008/0250202 A1 | 10/2008 | Conley et al. | |
| 2008/0270639 A1 | 10/2008 | Elhamias et al. | |
| 2008/0320253 A1 | 12/2008 | Tomlin et al. | |
| 2009/0019459 A1* | 1/2009 | Rowan et al. | 719/328 |
| 2009/0077304 A1 | 3/2009 | Hong et al. | |
| 2009/0164681 A1 | 6/2009 | Elhamias et al. | |
| 2009/0172308 A1 | 7/2009 | Prins et al. | |
| 2009/0222629 A1* | 9/2009 | Yano et al. | 711/137 |
| 2009/0276681 A1* | 11/2009 | Ou | H04L 1/0045 714/752 |
| 2010/0118587 A1 | 5/2010 | Chen et al. | |
| 2010/0318734 A1* | 12/2010 | Vaid | G06F 12/0866 711/113 |
| 2011/0022898 A1 | 1/2011 | Stolero et al. | |
| 2012/0204077 A1* | 8/2012 | D'Abreu | G06F 11/10 714/755 |
| 2012/0239854 A1* | 9/2012 | Hsueh | G06F 12/0866 711/103 |

OTHER PUBLICATIONS

International Preliminary Report on Patentability for International Application No. PCT/US2012/037068, dated Dec. 10, 2013, 5 pages.

* cited by examiner

SYSTEM AND METHOD TO BUFFER DATA

FIELD OF THE DISCLOSURE

The present disclosure is generally related to reading data from a memory.

BACKGROUND

Non-volatile memory devices, such as universal serial bus (USB) flash memory drives and removable storage cards, provide increased portability of data and software applications. Speed of data retrieval and power consumption of such memory devices can impact a user experience. Therefore, it would be beneficial to improve an average speed of data retrieval from a non-volatile memory device. It would also be beneficial to reduce power consumption associated with data retrieval from a non-volatile memory device.

SUMMARY

A data storage device is disclosed that retrieves data from a non-volatile memory in response to receiving a request for the data, such as a request from a host device. The retrieved requested data is cached in a buffer and is provided to the host device from the buffer. Additional, non-requested data is also retrieved form the non-volatile memory in response to the request. The additional data is cached in the buffer and is available to be provided to the host device. For example, the additional data may be speculatively or predictably retrieved from the non-volatile memory (e.g. as next sequential data) according to a read-ahead process. As another example, the additional data may be within a same data read unit of the non-volatile memory as the requested data. Providing the additional data from the buffer if the additional data is later requested may increase the speed of data retrieval as perceived by the host device. When the additional data is within a same data read unit as the requested data, power consumption may also be reduced by avoiding a second access to the same data read unit of the non-volatile memory.

DETAILED DESCRIPTION

Figure 1:
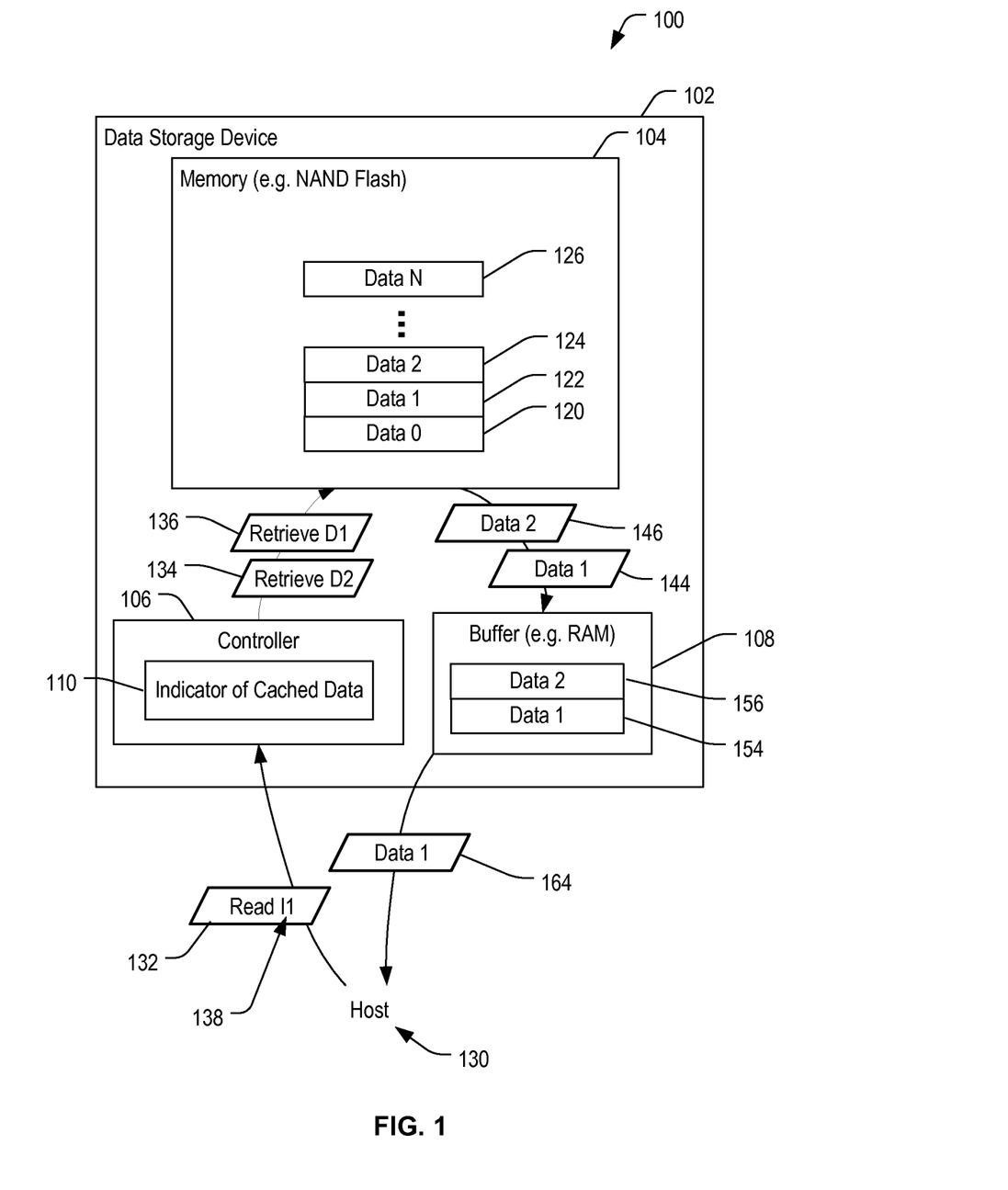
FIG. 1 is a block diagram of a particular embodiment of a system to cache requested read data and additional unrequested data at a buffer of a data storage device.

Referring to FIG. 1, a particular embodiment of a system including a data storage device 102 and a host device 130 is depicted and generally designated 100. The data storage device 102 is responsive to a request 132 for read access received from the host device 130 by retrieving requested data and also retrieving unrequested additional data for storage in a buffer 108. The requested data is returned to the host device 130 from the buffer 108 while the unrequested additional data remains stored in the buffer 108 to enable accelerated access to the additional data if the additional data is later requested.

The host device 130 may be a device that is configured to be operatively coupled to the data storage device 102, such as a mobile telephone, a music or video player, a personal digital assistant (PDA), a gaming device, an electronic-book reader, a camera, a computer (such as a laptop or notebook computer), any other electronic device, or any combination thereof. The host device 130 is configured to send instructions to the data storage device 102, such as the request 132 for read access.

The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be embedded memory in the host device 130, such as eMMC® (trademark of JEDEC Solid State Technology Association, Arlington, Va.) and eSD, as illustrative examples.

The data storage device 102 includes a controller 106, a memory 104, and the buffer 108. The memory 104 may be a solid state non-volatile memory, such as a flash memory. In an illustrative embodiment, the memory 104 includes a NAND flash.

The controller 106 is configured to receive messages, such as the request 132 for read access, from the host device 130. The controller 106 is configured to respond to requests for read access or requests for write access to the memory 104. For example, the controller 106 is configured to retrieve data from the memory 104 that is requested by the host device 130 and to initiate sending requested data to the host device 130.

The controller 106 also includes an indicator 110 of cached data. The indicator 110 includes one or more indications corresponding to data that is stored in the buffer 108, such as described with respect to FIG. 2. The controller 106 is configured to read the indicator 110 in response to receiving a request for read access to the non-volatile memory 104 to determine whether requested data is cached in the buffer 108. In response to the indicator 110 indicating that the requested data is cached in the buffer, the controller 106 provides the requested data from the buffer 108 to the host device 130. Otherwise, if there is no indication that the requested data is cached, the controller 106 retrieves the requested data and unrequested additional data from the memory 104, stores the requested data and the unrequested additional data to the buffer 108, and provides the requested data from the buffer 108 to the host device 130.

The memory 104 includes stored data, such as Data 0 120-Data N 126. For example, the memory 104 includes first data (Data 1) 122 that is sequentially followed by second data (Data 2) 124. To illustrate, the data 120-126 may correspond to one or more word lines of the memory 104, portions of a word line, such as sectors, or data stored in multiple sequential memory addresses of the memory 104, as illustrative, non-limiting examples. Although the memory 104 is illustrated as storing the data 120-126, it should be understood that the memory 104 may store other data.

The buffer 108 is configured to store data that is accessible to be read from the buffer 108 by the host device 130. As an illustrative example, the buffer 108 may include a random access memory (RAM) that is accessible by the controller 106. Data read from the memory 104 may be processed prior to being usable by the host device 130. As an example, error correction processing, such as an error correction coding (ECC) process, may be performed on the data that is read from the memory 104 to identify and correct one or more bit errors that may occur within the memory 104. The error corrected data may be stored within the buffer 108, such as buffered first data 154 and buffered second data 156, as illustrated in FIG. 1.

During operation, the request 132 for read access is sent from the host device 130 and received at the controller 106. The request 132 includes a first data identifier 138 indicating the first data 122 at the memory 104. For example, the first data identifier 138 may be an address of the first data 122. In response to receiving the request 132, the controller 106 reads the indicator 110 of cached data to determine whether the first data 122 corresponding to the first data identifier 138 is in the buffer 108. In response to the indicator 110 of cached data not indicating that the first data 122 corresponding to the first data identifier 138 is in the buffer 108, the controller 106 initiates retrieval of the first data 122 and the second data 124 from the non-volatile memory 104.

The second data 124 corresponds to a second data identifier that is different from the first identifier 138. For example, the second data 124 may be sequential to the first data 122 and may be retrieved in accordance with a read-ahead operation in anticipation of providing the second data 124 to the host device 130 at a later time. The second data 124 may be speculatively or predictably retrieved according to a read-ahead process, such as when a file is read from the memory 104 according to a predictable sequence of requests for read access. The first identifier 138 and the second identifier may be sequential physical addresses as described with respect to FIG. 3, sequential logical block addresses (LBAs) as described with respect to FIG. 4, sequential portions of an identified file in a flash file system implementation as described with respect to FIG. 5, one or more other types of identifiers, or any combination thereof.

As another example, the second data 124 may be included in a same data read block of the memory 104 as the first data 122. To illustrate, the memory 104 may be configured to be read in "blocks" or other read units that may be larger than the amount of data requested by the host device 130. The second data 124 may be read and processed with the first data 122 as part of a same read unit retrieved from the memory 104. For example, the first data 122 and the second data 124 may be within a single ECC codeword, as described with respect to FIG. 5.

The controller 106 may retrieve the first data 122 and the second data 124 from the memory 104 by issuing a first instruction 136 to retrieve the first data 122 and by issuing a second instruction 134 to retrieve the second data 124 from the non-volatile memory 104. In response to the instructions 134 and 136, retrieved first data 144 and retrieved second data 146 may be written to the buffer 108 from the memory 104. The retrieved first data 144 and the retrieved second data 146 may be processed prior to being written to the buffer 108, such as by a hardware-based ECC processor. As another example, ECC processing may be performed on data that has already been written to the buffer 108, such as via a processor-based ECC processing. After the retrieved first and second data 144, 146 have been processed and then stored in the buffer 108 as buffered first data 154 and buffered second data 156, respectively, the indicator 110 of cached data is updated by the controller 106 to indicate that the buffered first data 154 and the buffered second data 156 are stored in the buffer 108. The buffered first data 154 is provided to the host device 130 from the buffer 108 as sent first data 164. The buffered second data 156 remains in the buffer 108 to be available for the host device 130 at a later time.

The buffered second data 156 may remain in the buffer 108 until erased or overwritten. For example, in an implementation where the buffer 108 is a volatile memory, data stored at the buffer 108 may be lost when a power-off event occurs at the data storage device 102. As another example, the controller 106 may limit an amount of read data that may be cached at the buffer 108. Upon reaching the limit of read data allowed to be cached at the buffer, the controller 106 may cause subsequently requested data to overwrite existing read data at the buffer 108. For example, the controller 106 may implement a least recently used replacement policy or another replacement policy to manage caching of read data at the buffer 108. In some implementations, cached data may be erased or designated for removal or replacement in response to the cached data being provided to the host device 130. However, in other implementations cached data may be maintained in the buffer 108 independent of whether the data has been provided to the host device 130. For example, if the host device 130 is predicted to repeat a request to read certain data, the requested data may remain cached to be available for subsequent requests.

In some implementations, the controller 106 may be configured to read the first data 122 and the second data 124 from the non-volatile memory 104 in a pipelined manner. During a first time period, the first data 122 may be retrieved from the memory 104 and written into the buffer 108, and during a subsequent time period the first data 154 may be provided from the buffer 108 to the host device 130 while the second data 124 is retrieved from the memory 104 and written to the buffer 108. An example of pipelined data retrieval is described in further detail with respect to FIG. 6.

In response to the request 132 for read access to the first data 122, after determining that the first data 122 is not cached in the buffer 108, the controller 106 retrieves both the first data 122 and the second data 124 to the buffer 108, and the buffered first data 154 is provided the host device 130. Writing the second data 124 to the buffer 108 as the buffered second data 156 enables the data storage device 102 to bypass reading the second data 124 from the non-volatile memory 104 in response to a subsequent request for read access that includes the second data identifier. Fewer read accesses to the memory 104 enable increased read endurance of the memory 104. In addition, read performance to the host device 130 is improved due to reduced average read latency for data that is speculatively cached in the buffer 108 prior to the host read request. Further, reducing a number of accesses to the memory 104 reduces energy consumption. Reduced energy consumption prolongs a battery life of the data storage device 102 or the host device 130 and may enhance a user experience.

Figure 2:
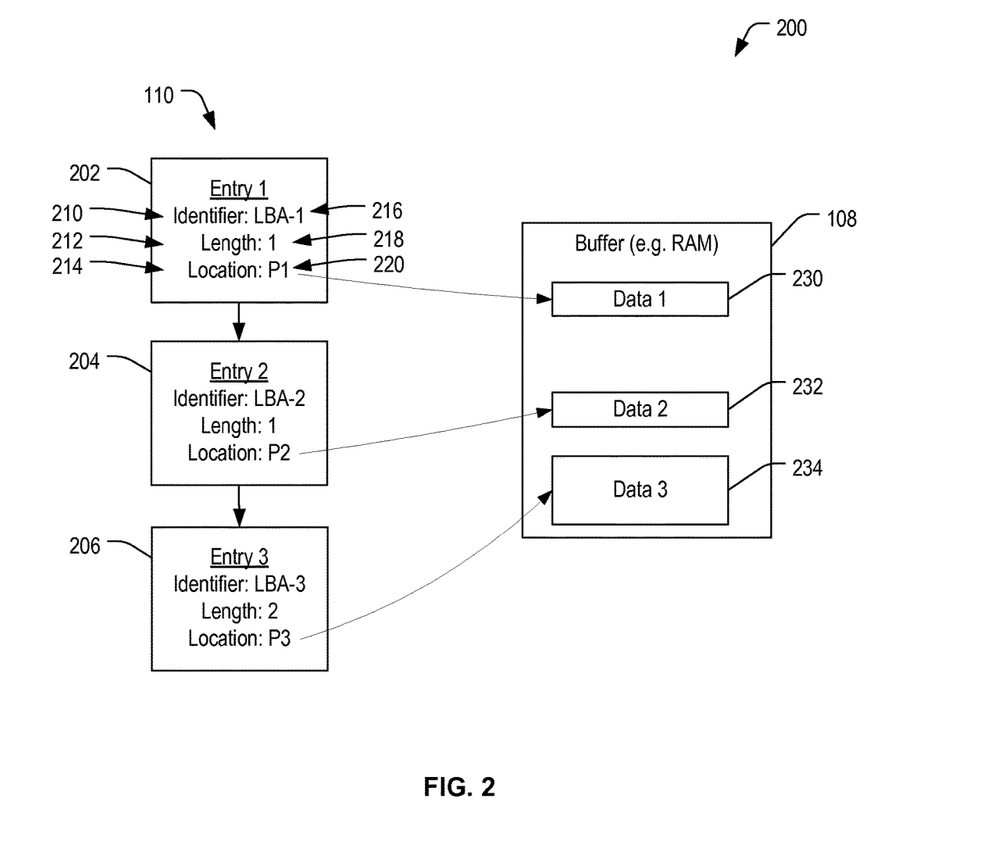
FIG. 2 is a general diagram that illustrates components of the system of FIG. 1.

Referring to FIG. 2, an example of further details of components of the system of FIG. 1 including the indicator 110 of cached data and the buffer 108 is depicted and generally designated 200. The indicator 110 of cached data is illustrated as including a list of one or more entries, including a first entry 202, a second entry 204, and a third entry 206. Each entry 202-206 includes an identifier of corresponding data in the buffer 108. For example, the first entry 202 includes an identifier field 210 with an identifier value (LBA-1) 216 that corresponds to a logical block address of first data (Data 1) 230 that is in the buffer 108. The second entry 204 includes an identifier field with an identifier value (LBA-2) that corresponds to a logical block address of second data (Data 2) 232 in the buffer 108. The third entry 206 includes an identifier field with an identifier value (LBA-3) that corresponds to a third logical block address for third data (Data 3) 234 in the buffer 108.

Each particular entry 202, 204, 206 of the list may indicate a starting address and length information of the data in the buffer 108 that corresponds to the particular entry. For example, the first entry 202 includes the identifier field 210 and also a length field 212 with a length value 218 of "1." The identifier value 216 may correspond to a starting address of the corresponding first data 230, and the length value 218 (i.e. "1") may indicate that the first data 230 has a length of 1 unit. For example, a length of "1" may indicate data from a single sector of the non-volatile memory 104 of FIG. 1. The first entry 202 also includes a location field 214 with a location value 220 indicating a location in the buffer 108, illustrated as a pointer value (P1) that points to a location of the corresponding first data 230 in the buffer 108.

Similarly, the second entry 204 indicates that the corresponding second data 232 is at a location P2 in the buffer 108, corresponds to a unit of data beginning at the logical address LBA-2, and has a length of one unit (e.g. a single sector of the memory 104 of FIG. 1). The third entry 206 indicates that the corresponding third data 234 is at a location P3 in the buffer 108, corresponds to a unit of data beginning at the logical address LBA-3, and has a length of two units (e.g. two sectors of the memory 104 of FIG. 1).

By identifying a starting address and a data length of data at the buffer 108, the indicator 110 of cached data can be read by the controller 106 of FIG. 1 to determine whether requested data is in the buffer 108. For example, the controller 106 may read starting address and length information, such as the identifier value 216 and the length value 218, from the first entry 202 of the list to determine whether the corresponding data of the first entry 202 (i.e. the first data 230) includes requested data. In response to determining that the corresponding data for the first entry 202 does not include the requested data, the controller 106 may read the starting address and the length information from the second entry 204. In this manner, the controller 106 may begin reading at the beginning of the list and may sequentially process each entry of the list until requested data is located in the buffer 108 by finding a corresponding entry in the indicator 110, or until the controller 106 determines that no entry in the indicator 110 corresponds to the requested data. After the controller 106 determines that no entry in the indicator 110 corresponds to the requested data, the controller 106 may initiate a retrieve operation to retrieve the requested data and the next subsequent data from the memory 104, as described in FIG. 1.

Although the indicator 110 is illustrated in FIG. 2 as a list of entries 202-206, in other implementations the indicator 110 may not be a list and may instead include one or more other types of data structures, such as an array, a table, or any other structure that enables storage of information corresponding to data stored at the buffer 108. In addition, although the indicator 110 is illustrated as a singularly-linked ordered list, in other embodiments the indicator 110 may be a doubly-linked list, may be unordered, or any combination thereof. Further, although each entry 202-206 is illustrated as having identifier, length, and location information, in other implementations the indicator 110 may not have one or more of identifier, length, and location information. The indicator 110 may instead have one or more other types of data that enable the controller 106 to determine whether requested data is stored in the buffer 108 and to enable retrieval from the buffer 108 of the requested data by the controller 106.

Figure 3:
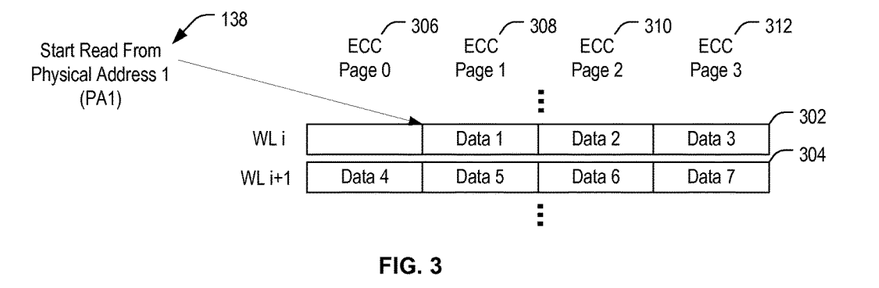
FIG. 3 is a diagrammatic illustration of data retrieval according to a physical addressing scheme that may be implemented by the data storage device of FIG. 1.

Referring to FIG. 3, a particular embodiment of retrieving data from the non-volatile memory 104 of FIG. 1 according to physical address is depicted. A first word line 302 (WL i) corresponds to an i-th word line of the non-volatile memory 104. A second word line 304 (WL i+1) is a next sequential word line of the non-volatile memory 104. The word lines 302 and 304 may be sequentially adjacent to each other and may correspond to sequential physical addresses. Each word line 302-304 is illustrated as storing ECC pages 306-312 including a first ECC page 306 (ECC Page 0), a second ECC page 308 (ECC Page 1), a third ECC page 310 (ECC Page 2), and a fourth ECC page (ECC Page 3).

As illustrated, the controller 106 may determine data to be read from the non-volatile memory 104 in response to receiving the first data identifier 138 via the read request 132 of FIG. 1. In the implementation illustrated in FIG. 3, the first data identifier 138 indicates a physical address (PA1) from which the requested data is to be read. As illustrated, the physical address PA1 corresponds to the second ECC page 308 of the first word line 302 storing first data (Data 1). In response to the first data not being stored at the buffer 108 of FIG. 1, the controller 106 may initiate a data read to read the first data stored at the second ECC page 308 of the first word line 302 and may also automatically request a data read of second data (Data 2) corresponding to the ECC page 310 (Page 2) of the first word line 302. The second data may be unrequested next sequential data that may be likely to be accessed following the first data. In accordance with a read-ahead operation, the controller 106 may be configured to sequentially access each of the remaining ECC pages of the first word line 302, and after accessing the third data (Data 3) at the ECC page 312 (Page 3), next sequential data (Data 4) may be read from the first ECC page 306 of the second word line 304.

To illustrate, the data storage device 102 may be compliant with a specification in which the data storage device 102 responds to a read instruction from the host device 130 by performing sequential reads until receiving a stop command from the host device 130. As a result, when the host device 130 issues the request 132 for read access indicating the physical address PA1, the data storage device 102 may sequentially access data from the memory 104 according to sequential physical addresses until receiving a stop instruction from the host device 130.

Alternatively, the host device 130 may be configured to send a read instruction indicating a specific amount of data. In response, the data storage device 102 may retrieve only the requested data, such as the first data (Data 1). However, the data storage device 102 may also retrieve the second data (Data 2) as a predicted target of a subsequent read request, to be cached in the buffer 108 for quicker access and retrieval in response to a subsequent read request for the second data being received.

Figure 4:
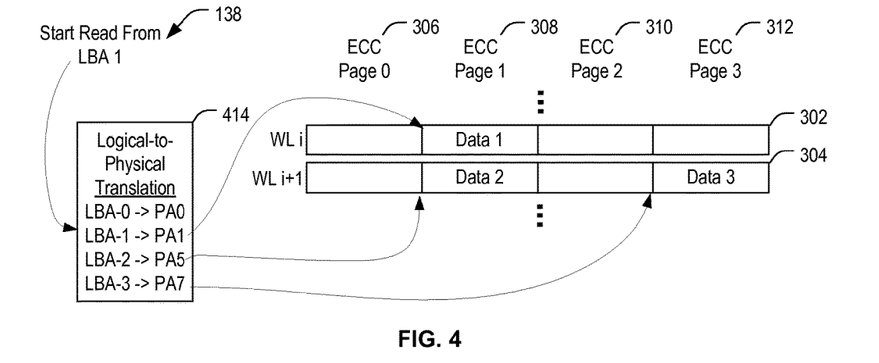
FIG. 4 is a diagrammatic illustration of data retrieval according to a logical block addressing scheme that may be implemented by the data storage device of FIG. 1.

Referring to FIG. 4, another implementation is depicted that includes a logical-to-physical translation table 414 to translate LBAs that are received in requests for read access from the host device 130. For example, the host device 130 may provide LBAs to the data storage device 102, and the controller 106 may access the logical-to-physical translation table 414 to translate between the received LBAs and physical addresses of the non-volatile memory 104. FIG. 4 depicts the non-volatile memory 104 having the word lines 302 and 304. The word lines 302, 304 are divided into ECC pages 306-312 in a manner similar to FIG. 3. However, the first data, the second data, and the third data in FIG. 4 are not stored in sequential physical addresses. In contrast, in FIG. 4, sequential logical block addresses LBA-0, LBA-1, LBA-2, and LBA-3 correspond to non-sequential physical addresses PA0, PA1, PA5, and PA7, respectively, according to the logical-to-physical translation table 414.

In response to the controller 106 receiving the first data identifier 138 indicating LBA-1 to retrieve the first data, the controller 106 initiates a data read from PA1 (the second ECC page 308 (Page 1) of the first word line 302) and further initiates a request for second data from physical address PA5, corresponding to a next sequential LBA (LBA-2). In an implementation where the controller 106 continues to retrieve sequential data elements until a stop command is received from the host device 130, a next sequential data read may be performed to read third data from physical address PA7, corresponding to a next sequential LBA (LBA-3).

In this manner, the host device 130 does not need to maintain physical address information of the non-volatile memory 104 and may instead request data using logical block addressing. The data storage device 102 may update the logical-to-physical translation table 414 in response to various factors, such as wear-leveling, garbage collection, or one or more other factors associated with memory management.

Figure 5:
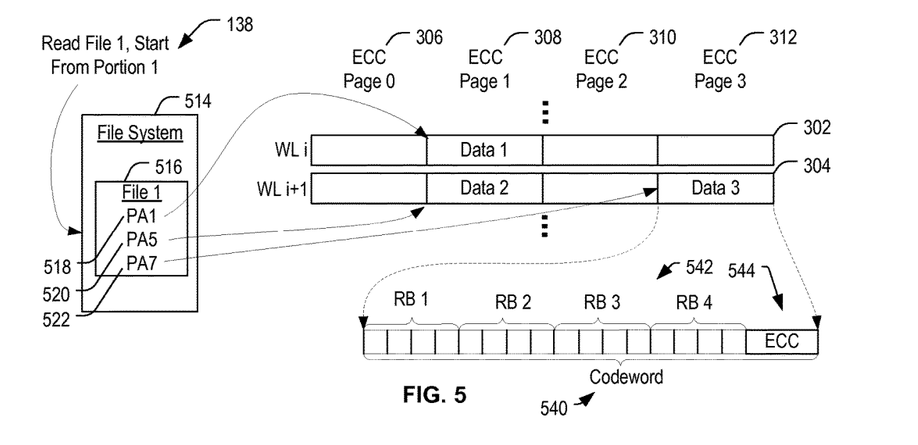
FIG. 5 is a diagrammatic illustration of data retrieval according to a file system that may be implemented by the data storage device of FIG. 1.

Referring to FIG. 5, another implementation is depicted where the data storage device 102 implements a file system, such as a flash file system. The file system 514 is illustrated as having a first file entry 516 that has three file portions 518, 520, and 522. The file portions 518-522 are sequential and stored at physical addresses PA1, PA5, and PA7, respectively. The first physical address PA1 is an address of first data of the file indicated by the first file entry 516, the second physical address PA5 is an address of second data of the file, and the third physical address PA7 is an address of third data of the file. In the embodiment of FIG. 5, the first data identifier 138 may identify the data to be read by identifying the file, such as the file corresponding to the first file entry 516, and a starting position, such as an indication to read from the first portion 518 of the file.

Data stored at each ECC page 306, 308, 310, 312 of the word lines 302, 304 may be stored as a single ECC codeword, such as the representative ECC codeword 540. The ECC codeword 540 has a data portion 542 and a redundancy portion (ECC) 544 that stores parity bits or other redundant data that enables detection and correction of errors when reading the codeword 540 from the non-volatile memory 104. The ECC codeword 540 may include multiple read blocks, such as a first read block RB1, a second read block RB2, a third read block RB3, and a fourth read block RB4. Each read block may be sized to correspond to a read unit size used by the host device 130. For example, the host device 130 may request data segments of 512 bytes, and each of the read blocks RB1-RB4 may be 512 bytes long. However, because in many ECC implementations a relative correction coding strength improves as the codeword length increases, the four read blocks RB1-RB4 may be combined into a single codeword. As a result, error correction is enhanced as compared to using a smaller ECC codeword for each read block.

In order to read any particular read block of the codeword 540, the entire codeword 540 is retrieved from the non-volatile memory and decoded. Each of the multiple read blocks of the codeword may be stored in the buffer 108 rather than discarded. By being stored in the buffer 108, subsequent read requests to any of the read blocks RB1-RB4 may be satisfied from data cached at the buffer 108 after performing a single read of the ECC page and a single ECC error correction process for the ECC codeword 540.

Although the multiple read blocks within a single codeword implementation is illustrated in the flash file system example shown in FIG. 5, it should be understood that any of the implementations of FIGS. 1-5 may include a similar implementation of multiple read blocks in a single ECC codeword. Similarly, it should be understood that any of FIGS. 1-5 may include other implementations, such as having each ECC codeword store data sized to correspond to a host read unit size, as opposed to storing multiple read block in a single ECC codeword.

Figure 6:
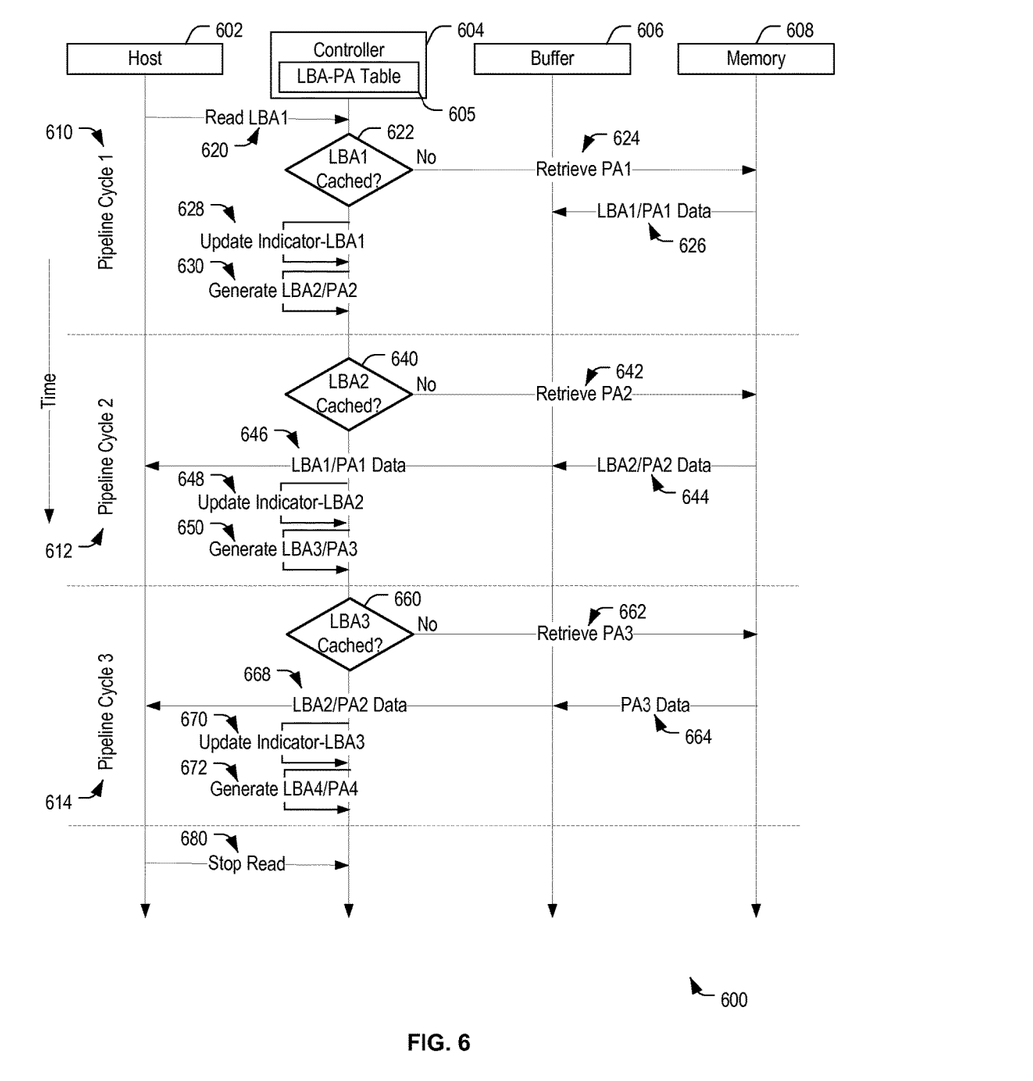
FIG. 6 is a ladder diagram illustrating a particular embodiment of pipelined data retrieval and buffering that may be implemented by the data storage device of FIG. 1.

FIG. 6 depicts an example 600 of pipelined data retrieval according to a sequence of LBAs. A host 602, such as the host device 130 of FIG. 1, communicates with a data storage device, such as the data storage device 102 of FIG. 1. The data storage device includes a controller 604, a buffer 606, and a memory 608. For example, the controller 604 may correspond to the controller 106 of FIG. 1. The controller 604 includes a logical-to-physical translation table 605 that may correspond to the logical-to-physical translation table 414 of FIG. 4. The buffer 606 may correspond to the buffer 108 of FIG. 1, and the memory 608 may correspond to the memory 104 of FIG. 1.

During a first pipeline cycle 610, a request may be received from the host 602 at the controller 604 to read a first LBA (LBA1), at 620. The controller 604 determines whether the first LBA is cached at the buffer 606, at decision 622. For example, the controller 604 can access an indicator of data cached at the buffer 606, such as the indicator 110 of FIG. 1. In response to determining that the data corresponding to first LBA is not cached at the buffer 606, the controller 604 sends an instruction to retrieve the requested data at a first physical address (PA1), at 624. For example, the controller 604 may perform a table lookup operation at the logical-to-physical translation table 605 to determine a physical address that corresponds to the first logical block address.

The memory 608 provides retrieved data corresponding to the first logical block address and the first physical address to the buffer 606, at 626. The controller 604, in response to the retrieved data being stored to the buffer 606, updates an indicator, such as the indicator 110 of cached data of FIG. 1, to indicate the first LBA, at 628. The controller 604 also generates a next sequential LBA and determines a corresponding physical address, illustrated as LBA2 and PA2, at 630.

In a next pipeline cycle 612, the controller 604 determines whether data corresponding to LBA2 is stored at the buffer 606, at decision 640. In response to determining that data corresponding to LBA2 is not cached at the buffer 606, the controller 604 sends an instruction to retrieve the data at the second physical address PA2 corresponding to LBA2, at 642. The retrieved data corresponding to the second physical address and the second LBA is retrieved from the memory 608 and is stored in the buffer 606, at 644. Data corresponding to LBA1/PA1 is provided to the host device 602 from the buffer 606, at 646. The indicator is updated to indicate that data corresponding to LBA2 is stored in the buffer 606, at 648, and the controller 604 generates the next sequential LBA (LBA3) and a physical address (PA3) corresponding to LBA3, at 650.

In the third pipeline cycle 614, the controller 604 determines whether data corresponding to LBA3 is cached at the buffer 606, at decision 660. In response to determining that the data corresponding to LBA3 is not stored in the buffer 606, the controller 604 sends an instruction to the memory 606 to retrieve data from physical address PA3, corresponding to LBA3. The data from the physical address PA3 is retrieved from the memory 608, at 664, and stored in the buffer 606. The data corresponding to the second physical address (PA2) and the second LBA (PA2) is provided to the host 602 from the buffer 606, at 668. The controller 604 updates the indicator to indicate storage of the data corresponding to LBA3, at 670. The controller 604 generates the next sequential LBA (LBA4) and determines a physical address (PA4) corresponding to LBA4, at 672.

In the next sequential pipeline cycle, an instruction from the host 602 is received at the controller 604 to stop the read process, at 680. The data corresponding to LBA3 is therefore not provided to the host device 130 as part of the sequential read operation. However, the data corresponding to LBA3 remains cached at the buffer 606 and available to be provided to the host 602 for a possible later read request from the host 602. Data corresponding to LBA1 and LBA2 may also remain in the buffer 606 based on an amount of available buffer space and a read data replacement policy for the buffer 606.

Figure 7:
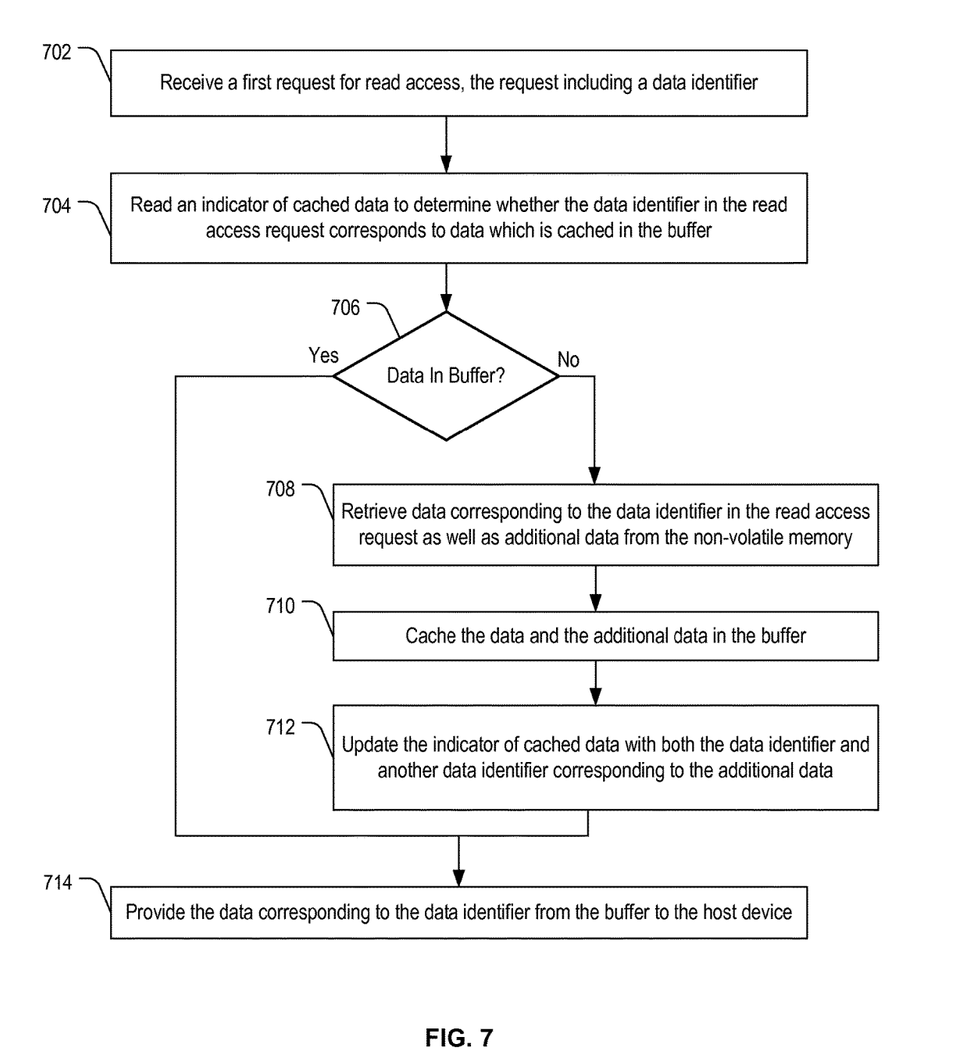
FIG. 7 is a flow diagram illustrating a particular embodiment of data retrieval and buffering that may be implemented by the data storage device of FIG. 1.

FIG. 7 depicts a flow chart of a method that may be performed in a data storage device with a controller, a non-volatile memory, and a buffer, such as the data storage device 102 of FIG. 1. The non-volatile memory may include a flash memory and the buffer may be a random access memory (RAM) that is accessible to the controller.

A request for read access is received, at 702. The request includes a data identifier, such as the identifier 138 of FIG. 1. The request for read access is received from a host device while the data storage device is operatively coupled to the host device. For example, the host device may be the host device 130 of FIG. 1.

An indicator of cached data is read to determine whether the data identifier in the read access request corresponds to data which is cached in the buffer, at 704. For example, the indicator of cached data may include a list of one or more entries, such as the indicator 110 illustrated in FIG. 2. Each entry may include an identifier of corresponding data stored in the buffer, such as the identifier value 216 of FIG. 2. The data identifier received from the read request may include a first address, and the identifier in each particular entry of the list may indicate a starting address and length information (e.g. the length value 218 of FIG. 2) of the corresponding data in the buffer.

Reading the indicator to determine whether the data identifier in the read access request corresponds to data which is cached in the buffer can include reading the starting address and the length information from a first entry of the list. The starting address and the length information may be used to determine whether the corresponding data for the first entry includes the data corresponding to the data identifier. For example, the first address can be compared to the starting address and to an ending address (e.g. the starting address plus an offset corresponding to the length information). In this example, the first entry corresponds to the requested data when the first address is greater than or equal to the starting address and the first address is less than or equal to the ending address.

In response to determining that the corresponding data for the first entry does not include the data corresponding to the data identifier, the starting address and the length information may be read from a second entry of the list. In this manner, the list may be traversed starting at a first entry and continuing to other list entries until an entry corresponding to the requested data is located or until all entries have been processed.

In response to the determining that, based on the data identifier and the indicator of cached data, no data corresponding to the data identifier is cached in the buffer, at 706, data corresponding to the data identifier in the read access request as well as additional data are retrieved from the non-volatile memory, at 708. In a first embodiment, the additional data is included in a same data read unit of the non-volatile memory as the data. For example, the requested data may be in the second read block (RB2) of FIG. 5 within the data portion 542 of the codeword 540. The additional data may be the remaining read blocks of the codeword 540 (e.g. RB1, RB3, and RB4). The codeword 540 may be retrieved and decoded as a single codeword to recover the data (RB2) and the additional data (RB1, RB3, and RB4).

In a second embodiment, the additional data is subsequent data that is retrieved in accordance with a read-ahead operation in anticipation of receiving a subsequent request for read access with the other data identifier. The additional data may be speculatively or predictably retrieved according to a read-ahead process, such as when a file is read from the memory according to a predictable sequence of requests for read access. In one implementation of a read-ahead operation, the data identifier and the other data identifier are sequential physical addresses, as described in FIG. 3. Sequential physical addresses may be computed by incrementing a counter value containing at least a portion of a current address to generate a next sequential address.

In another implementation of a read-ahead operation, the data identifier and the other data identifier are sequential logical block addresses, as described in FIG. 4. Sequential LBAs may be computed by incrementing a counter value containing a current LBA to generate a next sequential LBA. The next sequential LBA may be provided as an index to a logical-to-physical translation table to locate a corresponding physical address in a table lookup operation. The physical addresses corresponding to consecutive LBAs may be consecutive or non-consecutive.

In another implementation of a read-ahead operation, the data identifier and the other data identifier identify a file and correspond to sequential portions of the file, as described in FIG. 5. For example, the file entry 516 of the file system 514 may be accessed to locate physical addresses of sequential portions of the file.

The data and additional data may be retrieved by issuing one or more commands to the memory to retrieve the data and the additional data, such as by issuing the first instruction 136 and the second instruction 134 of FIG. 1. The data and the additional data are cached in the buffer, at 710. The indicator of cached data is updated with both the data identifier and another data identifier corresponding to the additional data, at 712. For example, a new entry may be added to the list of the indicator (e.g. indicator 110 of FIG. 2) and populated with information corresponding to the data cached at the buffer. To illustrate, the identifier field 210, the length field 212, and the location field 214 of the new entry may be populated with values identifying and locating the cached data. In addition, another new entry may be added to the list and populated with information corresponding to the additional data cached at the buffer. To illustrate, the identifier field 210, the length field 212, and the location field 214 of the other new entry may be populated with values identifying and locating the cached additional data.

The data corresponding to the data identifier is provided from the buffer to the host device, at 714. Caching the additional data to the buffer enables the data storage device to bypass retrieving the additional data from the non-volatile memory in response to a subsequent request for read access to the additional data.

The method may also include invalidating at least a portion of the indicator when data is written to the memory. Writing data to the memory may cause the data cached in the buffer to no longer match the data stored in the memory. As a result, all cached data may be prevented from further access. For example, in response to receiving the request for write access including the data identifier, the list may be modified to prevent all data that has been written to the buffer in response to read requests from being read from the buffer.

Alternatively, only cached data that is affected by a memory write operation may be prevented from further access at the buffer. For example, in response to receiving a request for write access that includes the data identifier, the list may be modified to prevent the data corresponding to the data identifier at the buffer from being read from the buffer. Modifying the list may include locating an entry corresponding to the data identifier and performing at least one of modifying a starting address in the located entry, modifying length information in the located entry, and modifying a buffer address in the located entry.

Although various components depicted herein are illustrated as block components and described in general terms, such components may include one or more microprocessors, state machines, or other circuits configured to enable a data storage device, such as the data storage device 102 of FIG. 1, to perform the particular functions attributed to such components, or any combination thereof. For example, the controller 106 of FIG. 1 may represent physical components, such as controllers, state machines, logic circuits, or other structures to enable the data storage device 102 to retrieve requested data and additional unrequested data from a memory to be cached in a buffer.

The controller 106 may be implemented using a microprocessor or microcontroller programmed to access the indicator 110 in response to receiving a request for read access to the memory 104 and to issue read commands for the requested data and for unrequested additional data to be stored in the buffer 108. In a particular embodiment, loading the buffer 108 and updating the indicator 110 are implemented by a processor of the controller 106 executing executable instructions that are stored at the memory 104. Alternatively, or in addition, executable instructions that are executed by a processor may be stored at a separate memory location that is not part of the memory 104, such as at a read-only memory (ROM).

In a particular embodiment, the data storage device 102 may be a portable device configured to be selectively coupled to one or more external devices. However, in other embodiments, the data storage device 102 may be attached or embedded within one or more host devices, such as within a housing of a portable communication device. For example, the data storage device 102 may be within a packaged apparatus such as a wireless telephone, a personal digital assistant (PDA), gaming device or console, a portable navigation device, or other device that uses internal non-volatile memory. In a particular embodiment, the data storage device 102 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of non-volatile memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in a data storage device that includes a controller, a non-volatile memory, and a buffer, performing:
receiving from a host device a request indicating a first logical block address;
in response to the request and based on the first logical block address and an indicator of cached data, determining that no data corresponding to the first logical block address is cached in the buffer;
in response to the request, retrieving, from the non-volatile memory to the buffer, a first portion of a codeword, the first portion corresponding to first data associated with the first logical block address;
in response to the request and prior to receiving from the host device a second request indicating a second logical block address, performing a read-ahead operation that includes one or more read operations to retrieve a second portion of the codeword corresponding to second data from the non-volatile memory, the second data corresponding to the second logical block address;
caching the first data and the second data in the buffer;
providing the first data from the buffer to the host device in response to the request;
sending the second data to the host device;
upon receiving a command to stop the read-ahead operation, the command distinct from the request, terminating sending of additional data to the host device responsive to the request;
updating the indicator of cached data to indicate that the first data and the second data are stored at the buffer;
reading the indicator of cached data, wherein the indicator of cached data comprises an identifier of the first logical block address, a starting address associated with storage of the first data at the buffer, and a data length associated with storage of the first data at the buffer; and
in response to determining based on the identifier of the first logical block address that the first data is stored at the buffer, accessing the first data from the buffer based on one or more of the starting address or the data length.

2. The method of claim 1, wherein the command is received from the host device, and wherein the indicator of cached data is updated to include the first logical block address and the second logical block address in response to the first data and the second data being written to the buffer.

3. The method of claim 1, further comprising:
retrieving third data from the non-volatile memory during the read-ahead operation;
caching the third data to the buffer; and
in response to receiving the command, refraining from providing the third data to the host device, wherein:
the third data is provided to the host device if the command is not received, and
caching the third data to the buffer enables the data storage device to bypass retrieving the third data from the non-volatile memory in response to a subsequent request for read access to the third data.

4. The method of claim 1, wherein the first logical block address and the second logical block address comprise sequential logical block addresses, wherein the codeword includes multiple read blocks, and wherein each read block is sized to correspond to a read size used by the host device.

5. The method of claim 1, further comprising:
performing a second read-ahead operation to retrieve a third portion of the codeword corresponding to third data from the non-volatile memory, the third data corresponding to a third logical block address;
caching the third data in the buffer; and
sending the third data to the host device in response to the request.

6. The method of claim 1, wherein the indicator of cached data includes a list of one or more entries, each entry of the one or more entries including an identifier of corresponding data stored in the buffer.

7. The method of claim 6, further comprising, in response to receiving a second request for write access that includes the first logical block address, modifying the list to prevent the first data from being read from the buffer while permitting other data not corresponding to the first logical block address to be read from the buffer.

8. The method of claim 6, further comprising, in response to receiving a second request for write access that includes the first logical block address, modifying the list to prevent all data that has been written to the buffer in response to read requests from being read from the buffer.

9. The method of claim 1, wherein:
the indicator of cached data includes a list of one or more entries, each entry of the one or more entries including an identifier of corresponding data stored in the buffer, and
updating the indicator of cached data to indicate that the first data and the second data are stored at the buffer includes updating a length field of an entry of the one or more entries of the list.

10. The method of claim 1, wherein the non-volatile memory includes a flash memory, wherein the buffer is a random access memory (RAM) that is accessible to the controller, and wherein the first data is maintained in the buffer after providing the first data to the host device.

11. The method of claim 1, further comprising reading the indicator of cached data to determine whether the first logical block address corresponds to data that is cached in the buffer.

12. The method of claim 1, further comprising updating the indicator of cached data with the first logical block address and the second logical block address corresponding to the second data in response to determining, based on the first logical block address and the indicator of cached data, that no data corresponding to the first logical block address is cached in the buffer.

13. A data storage device comprising:
a non-volatile memory;
a buffer configured to store data retrieved from the non-volatile memory, the data to be accessible to a host device in response to receiving from the host device one or more requests for read access to the non-volatile memory; and
a controller configured to:
access the buffer;
read an indicator of cached data in response to receiving a request indicating a first logical block address;
in response to the request and the indicator of cached data not indicating that first data corresponding to the first logical block address is in the buffer, retrieve a first portion of a codeword, the first portion corresponding to the first data;
in response to the request and prior to receiving from the host device a second request indicating a second logical block address, perform a read-ahead operation to retrieve one or more other portions of the codeword corresponding to second data that corresponds to at least the second logical block address, send the second data to the host device, and upon receipt of a command to stop the read-ahead operation, the command distinct from the request, terminate additional data being sent to the host device responsive to the request;
write the first data and the second data to the buffer;
update the indicator of cached data to include the first logical block address and the second logical block address, wherein the indicator of cached data is updated in response to the first data and the second data being written to the buffer;
read the indicator of cached data, wherein the indicator of cached data comprises an identifier of the first logical block address, a starting address associated with storage of the first data at the buffer, and a data length associated with storage of the first data at the buffer; and
in response to a determination based on the identifier of the first logical block address that the first data is stored at the buffer, access the first data from the buffer based on one or more of the starting address or the data length.

14. The data storage device of claim 13, wherein the controller is further configured to read the first data and the second data from the non-volatile memory in a pipelined manner, wherein during a first time period the first data is retrieved from the non-volatile memory, and wherein during a subsequent time period the first data is provided from the buffer to the host device while the second data is retrieved from the non-volatile memory.

15. The data storage device of claim 14, wherein the first logical block address and the second logical block address corresponding to the second data are sequential logical block addresses, and wherein the controller is further configured to load retrieved data to the buffer in the pipelined manner according to a sequence of logical block addresses until the command is received from the host device.

16. The data storage device of claim 13, wherein the controller is further configured to read the first data and the second data from the non-volatile memory as portions of a single codeword that is stored at the non-volatile memory, the single codeword including a data portion and a parity portion.

17. The data storage device of claim 13, wherein the controller is further configured to retrieve third data corresponding to a third logical block address from the non-volatile memory and to cache the third data to the buffer, wherein the first logical block address, the second logical block address, and the third logical block address are sequential logical block addresses, and wherein the third data in the buffer enables retrieval of the third data from the non-volatile memory to be bypassed in response to a subsequent request for read access to the third data.

18. The data storage device of claim 13, wherein the non-volatile memory includes a flash memory, and wherein the buffer is a random access memory (RAM) that is accessible to the controller, and wherein the indicator of cached data is updated to include the first logical block address and the second logical block address in response to the first data and the second data being written to the buffer.

19. The data storage device of claim 13, further comprising a processor configured to perform error correction code (ECC) decoding operations, wherein the controller is further configured to initiate a decoding operation using the processor to decode a particular ECC codeword prior to caching the second data to the buffer.

20. The data storage device of claim 19, wherein the controller is further configured to cache third data to the buffer based on the read-ahead operation, to receive a request for read access for the third data, and to provide the third data to the host device from the buffer without initiating another decoding operation associated with the third data.

21. The data storage device of claim 19, wherein the first data and the second data each have a read unit size used by the host device.

22. The data storage device of claim 19, wherein the first data is stored at a first word line of the non-volatile memory, and wherein the second data is stored at a second word line of the non-volatile memory, the second word line separate from the first word line.

23. An apparatus comprising:
means for reading an indicator of cached data in response to a request indicating a first logical block address;
means for retrieving a first portion of a codeword in response to the request and the indicator of cached data not indicating that first data corresponding to the first logical block address is stored by a buffer, the first portion corresponding to the first data;
means for performing, in response to the request and prior to receiving from a host device a second request indicating a second logical block address, a read-ahead operation to retrieve one or more other portions of the codeword corresponding to second data, the second data corresponding to at least the second logical block address;
means for sending the second data to the host device;
means for terminating, upon receipt of a command to stop the read-ahead operation, the command distinct from the request, additional data being sent to the host device responsive to the request;
means for writing the first data corresponding to the first logical block address and the second data to the buffer;
means for updating the indicator of cached data to include the first logical block address and the second logical block address, wherein the indicator of cached data is updated in response to the first data and the second data being written to the buffer;
means for reading the indicator of cached data, wherein the indicator of cached data comprises an identifier of the first logical block address, a starting address associated with storage of the first data at the buffer, and a data length associated with storage of the first data at the buffer; and
means for accessing the first data, in response to determining based on the identifier of the first logical block address that the first data is stored at the buffer, from the buffer based on one or more of the starting address or the data length.

24. The apparatus of claim 23, wherein the second data in the buffer enables retrieval of the second data from means for storing to be bypassed in response to a subsequent request for read access to the second data, wherein the second data is independent of whether a second request for the unrequested second data is received, and wherein the indicator of cached data is updated to include the first logical block address and the second logical block address in response to the first data and the second data being written to the buffer.

* * * * *

UNITED STATES PATENT AND TRADEMARK OFFICE
CERTIFICATE OF CORRECTION

PATENT NO. : 10,031,850 B2
APPLICATION NO. : 13/154751
DATED : July 24, 2018
INVENTOR(S) : Reuven Elhamias Page 1 of 1

It is certified that error appears in the above-identified patent and that said Letters Patent is hereby corrected as shown below:

In the Claims

Column 13, Claim 5, Line 33-34, remove "in response to the request.".

Column 16, Claim 24, Line 42, remove "unrequested".

Signed and Sealed this
Twenty-second Day of September, 2020

Andrei Iancu
*Director of the United States Patent and Trademark Office*